United States Patent
Livanos

(10) Patent No.: US 11,050,788 B2
(45) Date of Patent: Jun. 29, 2021

(54) SEPP REGISTRATION, DISCOVERY AND INTER-PLMN CONNECTIVITY POLICIES

(71) Applicant: Cisco Technology, Inc., San Jose, CA (US)

(72) Inventor: Konstantin Livanos, Naperville, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 217 days.

(21) Appl. No.: 16/208,011

(22) Filed: Dec. 3, 2018

(65) Prior Publication Data

US 2020/0036754 A1     Jan. 30, 2020

Related U.S. Application Data

(60) Provisional application No. 62/711,654, filed on Jul. 30, 2018.

(51) Int. Cl.
| | |
|---|---|
| *H04L 29/06* | (2006.01) |
| *H04W 48/16* | (2009.01) |
| *H04W 60/00* | (2009.01) |
| *H04W 8/12* | (2009.01) |
| *H04W 8/04* | (2009.01) |
| *H04W 8/06* | (2009.01) |
| *H04W 8/02* | (2009.01) |
| *H04W 84/04* | (2009.01) |

(52) U.S. Cl.
CPC .............. *H04L 63/166* (2013.01); *H04W 8/02* (2013.01); *H04W 8/04* (2013.01); *H04W 8/06* (2013.01); *H04W 8/12* (2013.01); *H04W 48/16* (2013.01); *H04W 60/00* (2013.01); *H04W 84/042* (2013.01)

(58) Field of Classification Search
CPC ........ H04L 63/166; H04W 8/02; H04W 8/04; H04W 8/06; H04W 8/12; H04W 60/00; H04W 8/16; H04W 84/042
See application file for complete search history.

(56) References Cited

U.S. PATENT DOCUMENTS

| | | | |
|---|---|---|---|
| 2019/0253894 A1* | 8/2019 | Bykampadi | H04W 48/16 |
| 2020/0028921 A1* | 1/2020 | Cai | H04W 12/08 |
| 2020/0344306 A1* | 10/2020 | Kahn | G06F 9/45558 |
| 2020/0367148 A1* | 11/2020 | Baek | H04L 29/08 |

OTHER PUBLICATIONS

3GPP Organizational Partners, "3rd Generation Partnership Project; Technical Specification Group Services and System Aspects; System Architecture for the 5G System; Stage 2, (Release 15)", TS 23.501 3GPP TS 23.501 V15.3.0, Sep. 2018, 226 pages.

(Continued)

*Primary Examiner* — Thaddeus J Plecha
(74) *Attorney, Agent, or Firm* — Edell, Shapiro & Finnan, LLC

(57) ABSTRACT

Presented herein is a Security Edge Protection Proxy (SEPP) fully defined as a 5G network function (NF) that registers and is discoverable by consumer NFs. Inter-Public Land Mobile Network (PLMN) roaming connectivity polices enable the SEPP in the visiting PLMN to select the SEPP per producer NF-Type in the home PLMN, and to select a direct route between PLMNs or an indirect route via one or more an Internetwork Packet Exchange (IPX) providers.

20 Claims, 10 Drawing Sheets

(56) References Cited

OTHER PUBLICATIONS

3GPP Organizational Partners, "3rd Generation Partnership Project; Technical Specification Group Core Network and Terminals; 5G System; Technical Realization of Service Based Architecture; Stage 3, (Release 15)", 3GPP TS 29.500 V15.1.0, Sep. 2018, 29 pages.
5G Americas Whitepaper, "The Evolution of Security in 5G", Oct. 2018, 41 pages.
Stefan Schröder et al., "Security in 5G—Conclusions and outlook", downloaded Nov. 29, 2018, 21 pages.
Frank Mademann, 3GPP, "The Mobile Broadband Standard", http://www.3gpp.org/NEWS-EVENTS/3GPP-NEWS/1930-SYS_ARC, Dec. 21, 2017, 7 pages.
3GPP Organizational Partners, "3rd Generation Partnership Project; Technical Specification Group Services and System Aspects; Procedures for the 5G System; Stage 2, (Release 15)", 3GPP TS 23.502 V15.3.0, Sep. 2018, 330 pages.

* cited by examiner

SEPP REGISTRATION, DISCOVERY AND INTER-PLMN CONNECTIVITY POLICIES

PRIORITY CLAIM

This application claims priority to U.S. Provisional Application No. 62/711,654, filed Jul. 30, 2018, the entirety of which is incorporated herein by reference.

TECHNICAL FIELD

The present disclosure relates to a mobile core infrastructure network for mobile network services.

BACKGROUND

A Security Edge Protection Proxy (SEPP) is a non-transparent proxy that resides at the border between a Visited Public Land Mobile Network (vPLMN) and a Home PLMN (hPLMN) in a mobile core infrastructure network. A Visited Public Land Mobile Network is a PLMN upon which a mobile subscriber has roamed when leaving their HPLMN.

A primary functionality of the SEPP is to proxy a message from a consumer Network Function (NF) in the vPLMN, such as the Unified Data Management (UDM), to a NF producer in the hPLMN, such as the Authentication Server Function (AUSF), over the inter-PLMM N32 interface.

DESCRIPTION OF EXAMPLE EMBODIMENTS

Overview

Presented herein is a Security Edge Protection Proxy (SEPP) fully defined as a 5G network function (NF) that registers and is discoverable by consumer NFs. More specifically, a method is provided that is performed in a mobile core infrastructure network having a home network and a visited network to which a mobile subscriber device has roamed from the home network. The method comprising providing/deploying one or more visited security edge protection proxies for the visited network that reside at a border between the visited network and the home network. Similarly, one or more home security edge protection proxies are provided/deployed for the home network that reside at a border between the home network and the visited network. The one or more visited security edge protection proxies are registered with a visited network function repository function, and the one or more home security edge protection proxies are registered with a home network function repository function. The visited network function repository function performs a discovery service to the home network function repository function to obtain information about network function instances in the home network. The home network function repository function selects a network function producer in the home network. The home network function repository function selects one of the one or more security edge protection proxies in the home network for the selected network function producer in the home network based on a type of the selected network function producer. The visited network function repository function stores an identifier allocated by the home network function repository function, for the selected network function producer in the home network.

EXAMPLE EMBODIMENTS

A consumer NF in the vPLMN cannot discover the vSEPP because the SEPP does not register with the NF Repository Function (NRF) (and as such is not discoverable). The Visited SEPP (vSEPP) in the vPLMN cannot discover the Home SEPP (hSEPP) of an inbound roamer. The vSEPP does not have route selection polices (direct route versus via an Internetwork Packet Exchange (IPX)) for connection to the hSEPP.

A "non-transparent proxy" refers to the SEPP's attribute to integrity protect a set of JavaScript Object Notation (JSON) objects in a message and encrypt others, such as Subscriber Permanent Identifier (SUPI), Location Information and authentication vectors.

Figure 1A:
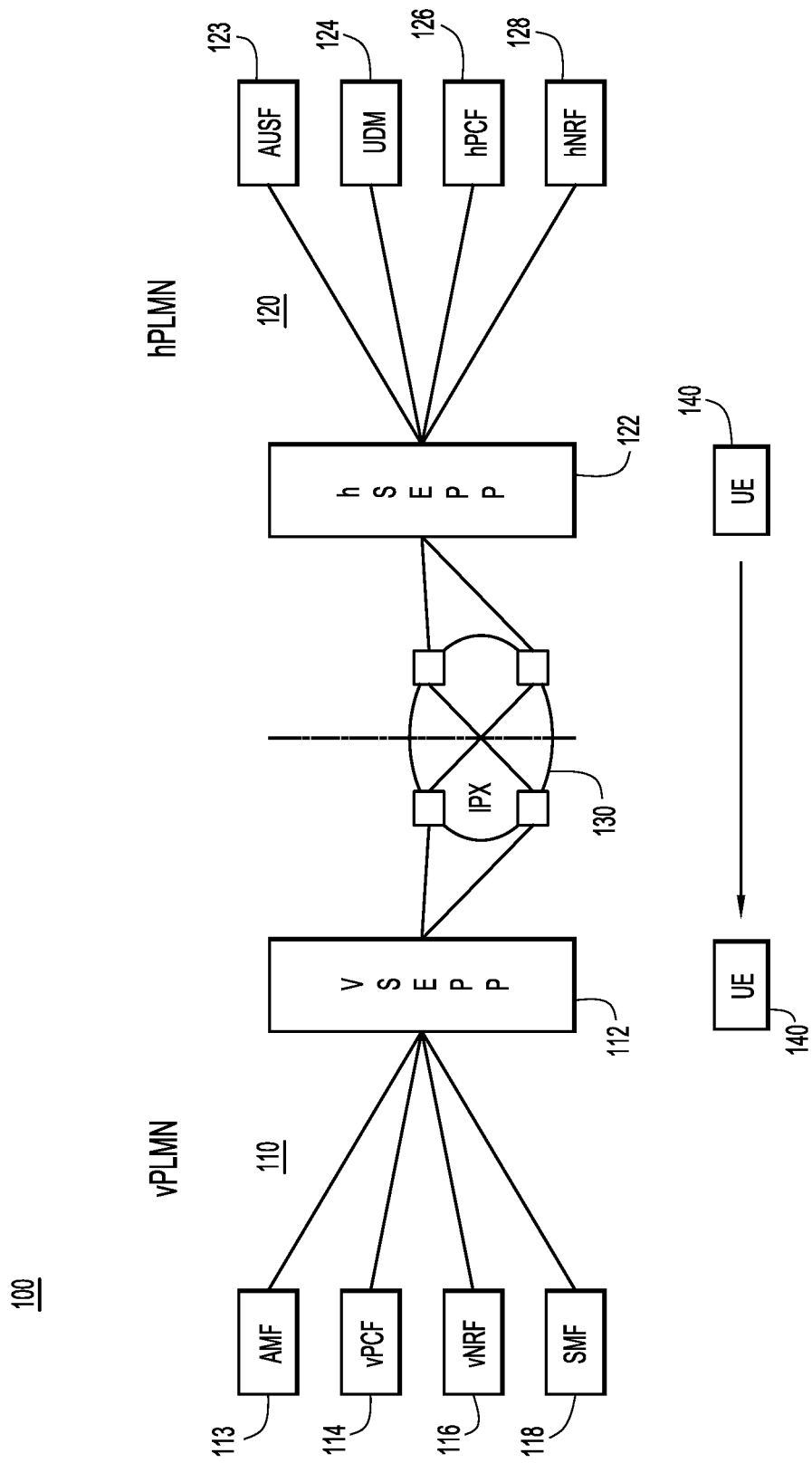
FIG. 1A is a block diagram of a roaming system architecture depicting a local breakout scenario, according to an example embodiment.
Figure 1B:
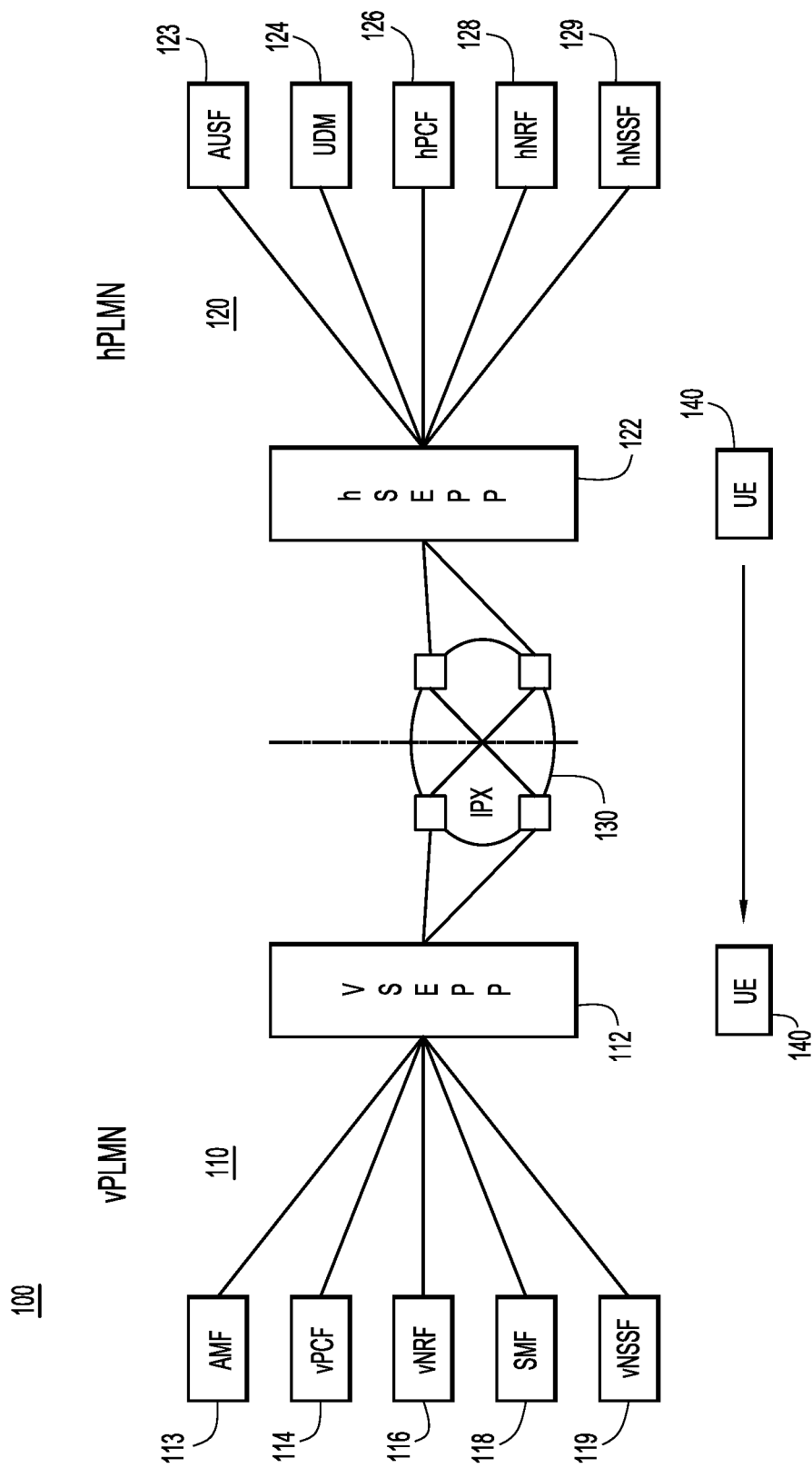
FIG. 1B is a block diagram of a roaming system architecture depicting a home routed scenario, according to an example embodiment.

Reference is first made to FIGS. 1A and 1B. FIG. 1A shows a reference point representation of a local break scenario for a 5G system roaming architecture and FIG. 1B shows a reference point representation of a home routed scenario for a 5G system roaming architecture. In each of these figures, there is a vSEPP in the vPLMN and an hSEPP in the hPLMN. Specifically, FIG. 1A shows a system 100 that includes a vPLMN 110 and an hPLMN 120.

In the vPLMN 110, there are several function entities that need connectivity with entities in the home network 110. For example, in the visiting network there are:

Access and Mobility Management Function (AMF) 113
Visiting Policy Control Function (vPCF) 114
Visiting Network Function Repository Function (vNRF) 116
Session Management Function (SMF) 118
In the hPLMN 120, there are:
Authentication Server Function (AUSF) 123
Unified Data Management (UDM) 124
Home Policy Control Function (hPCF) 126
Home Network Function Repository Function (hNRF) 128

FIGS. 1A and 1B show connectivity between the vSEPP and hSEPP being by way of the IPX 130, which is a network layer protocol in the Internetwork Packet Exchange/Sequenced Packet Exchange (IPX/SPX) protocol suite. Networks can run multiple network protocols, so almost all IPX sites support Transport Control Protocol/Internet Protocol (TCP/IP) as well to allow for Internet connectivity.

In FIG. 1B, there are additional functions:
Visiting Network Slice Selection Function (vNSSF) 119
Home Network Slice Selection Function (hNSSF) 129

In both FIGS. 1A and 1B, the vSEPP 112 connects to all of the associated entities (AMF 113, vPCF 114, vNRF 116, SMF 118 and vNSSF 1119) and likewise the hSEPP 122 connects to all of the associated entities (AUSF 123, UDM 124, hPCF 126, hNRF 128 and vNSSF 129).

FIGS. 1A and 1B show a UE 140 roaming from its home network (hPLMN 120) to a visiting network (vPLMN 110. In a roaming scenario of FIG. 1A, the AMF 113 needs to discover the AUSF 123; the vPCF 114 needs to discover the hPCF 126, and importantly the vNRF 116 needs to discover the hNRF 126. Finally, the SMF 118 needs to discover the UDM 124.

Similar communication needs to occur in the roaming scenario of FIG. 1B. Furthermore, the vNSSF 119 needs to discover the hNSSF 129.

Figure 2:
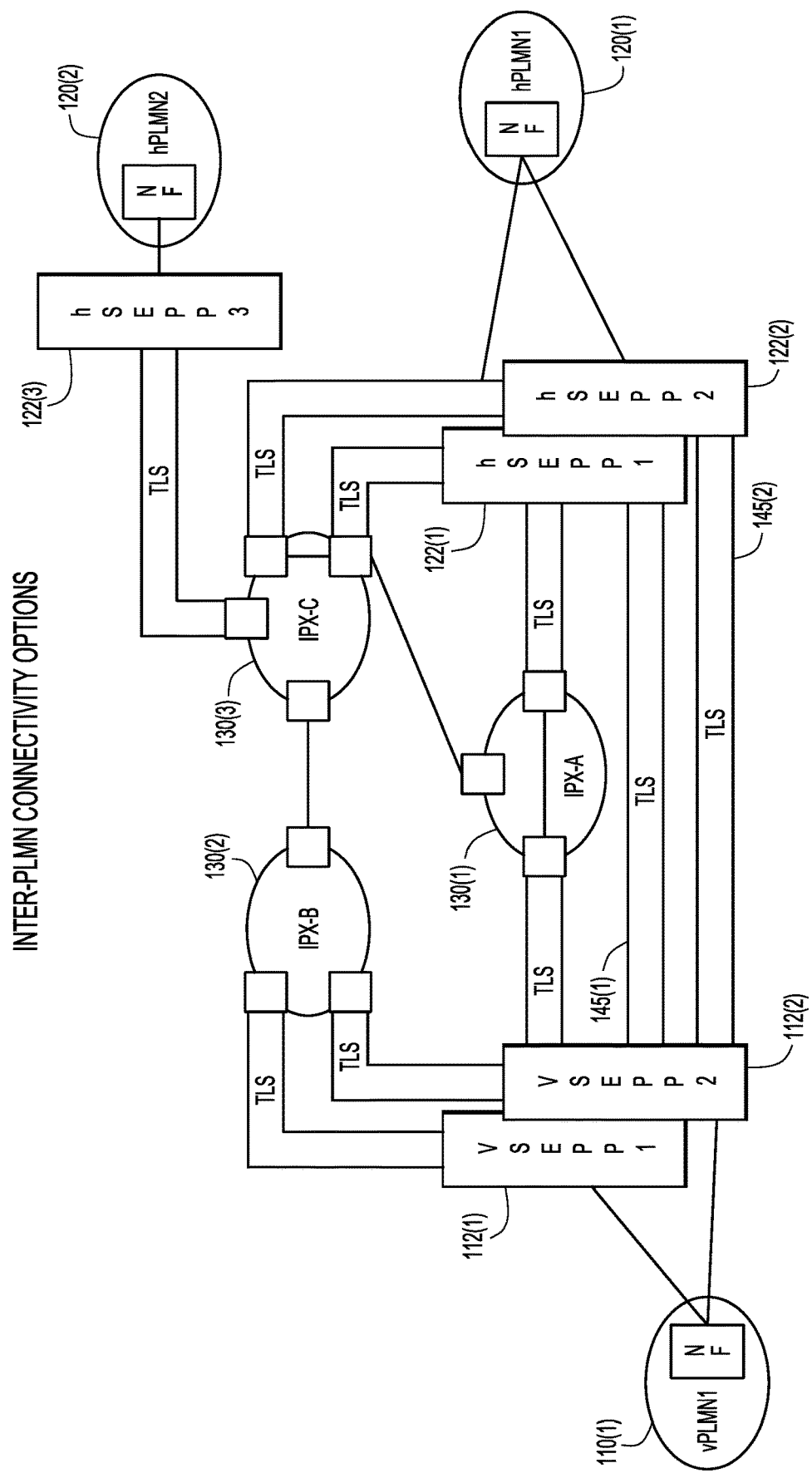
FIG. 2 illustrates inter-PLMN connectivity options, according to an example embodiment.

FIG. 2 shows inter-PLMN connectivity options. In the example of FIG. 2, there is one vPLMN 110(1) (denoted vPLMN1) and two hPLMNs 120(1) (denoted hPLMN1) and 120(2) (denoted hPLMN2). FIG. 2 shows that multiple vSEPPs, such as vSEPP1 and vSEPP2 shown at 112(1) and 112(2), respectively, in the vPLMN 110 may communicate with the hSEPPs, such as hSEPP1, hSEPP2 shown at 122(1) and 122(2) in the hPLMN 120(1) and hSEPP3 122(3) in the hPLMN2 120(2). FIG. 2 further shows that communication between vSEPPs and hSEPPs may be via an IPX network, such as directly via IPX-A shown at 130(1), or via IPX-B at 130(2) and IPX-C at 130(3), or directly via Transport Layer Security (TLS) protocol shown at 145(1) and 145(2).

Figure 3A:
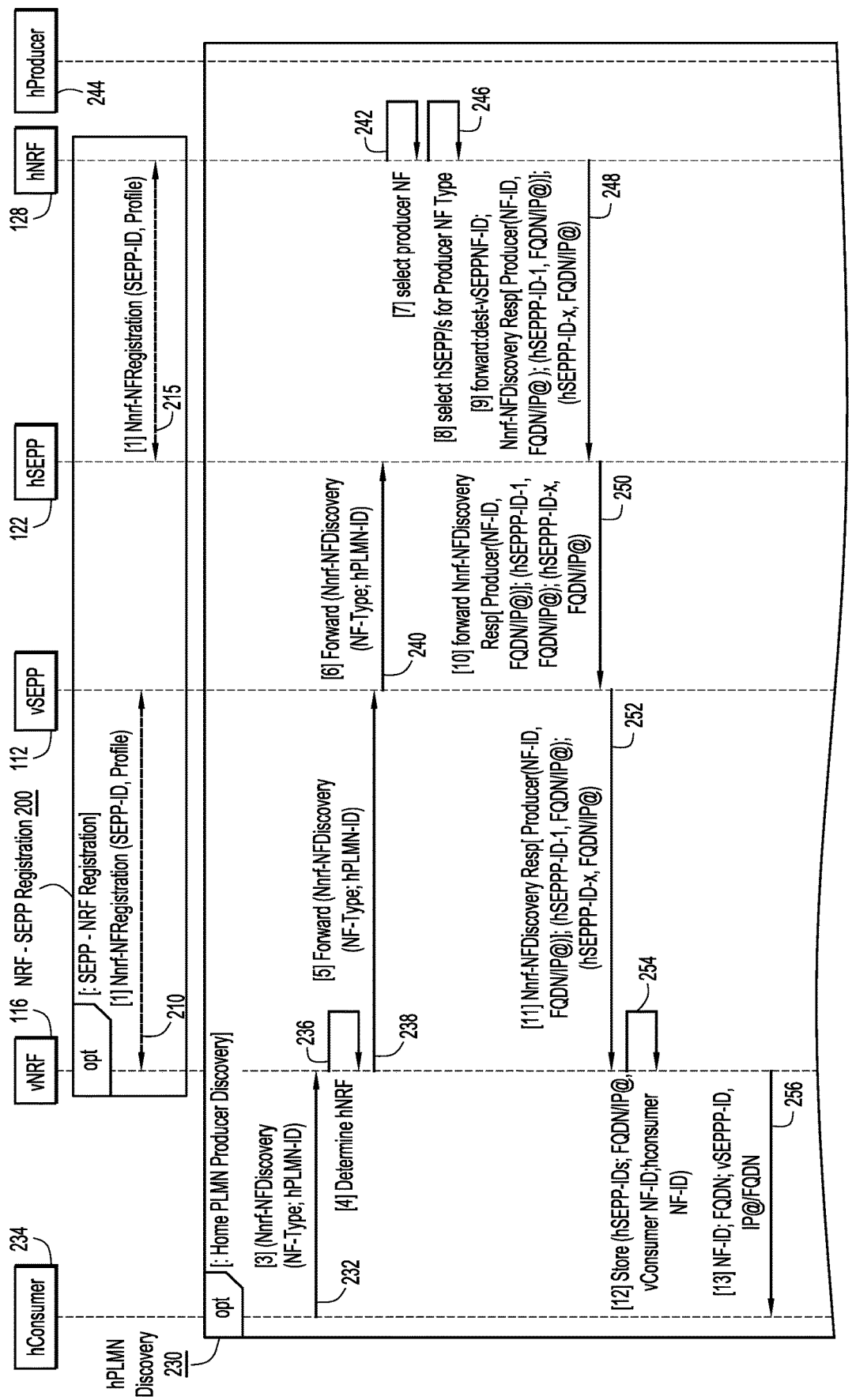
FIGS. 3A and 3B depict a sequence diagram depicting a registration phase and an hPLMN discovery phase, according to an example embodiment.
Figure 3B:
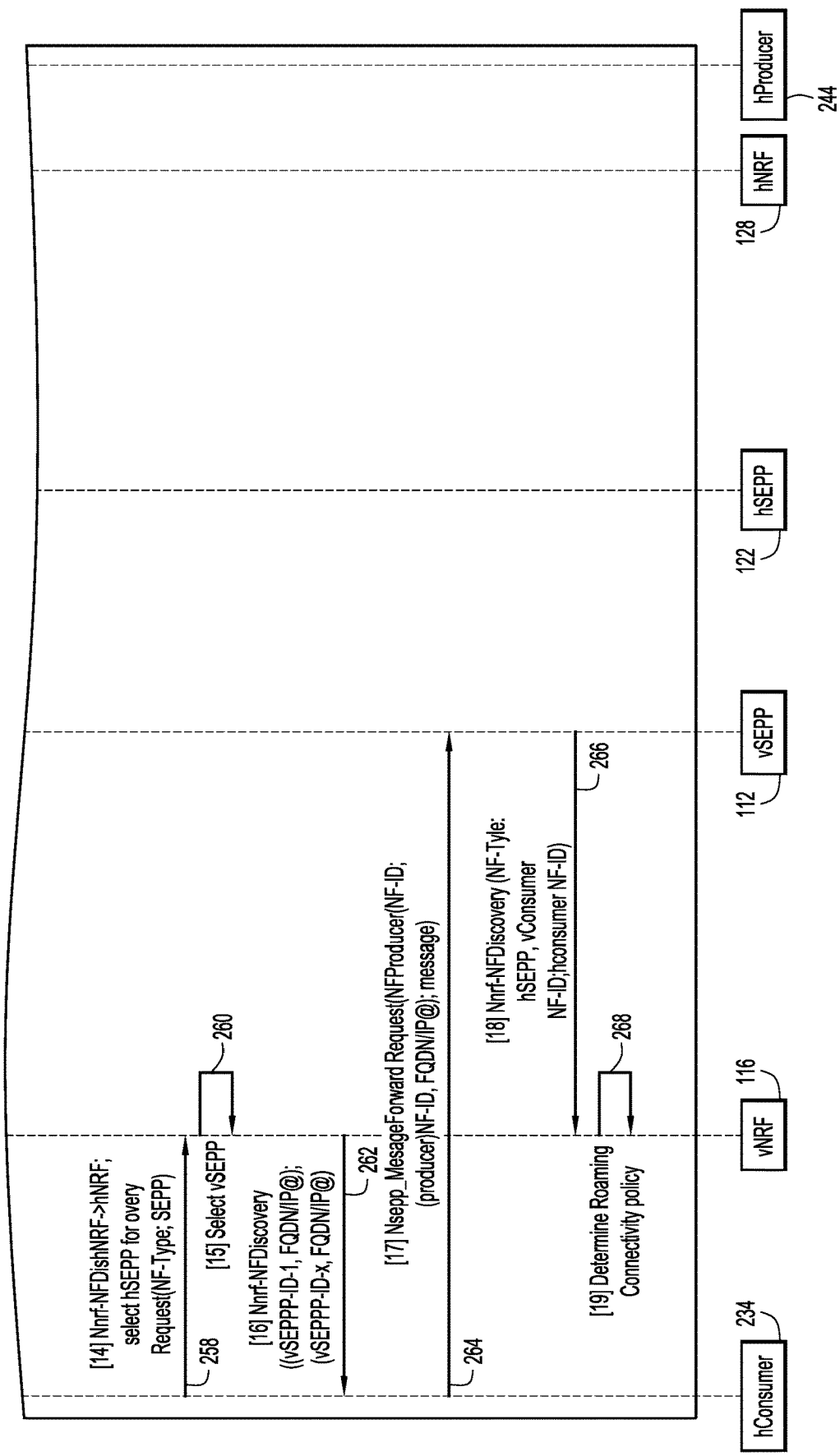
Figure 4:
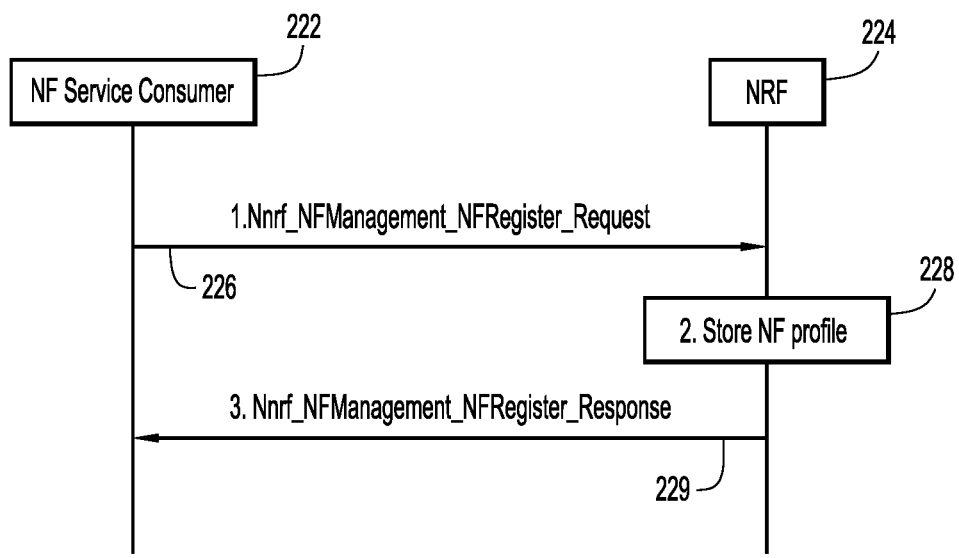
FIG. 4 is a diagram illustrating the registration phase in more detailed, according to an example embodiment.
Figure 5:
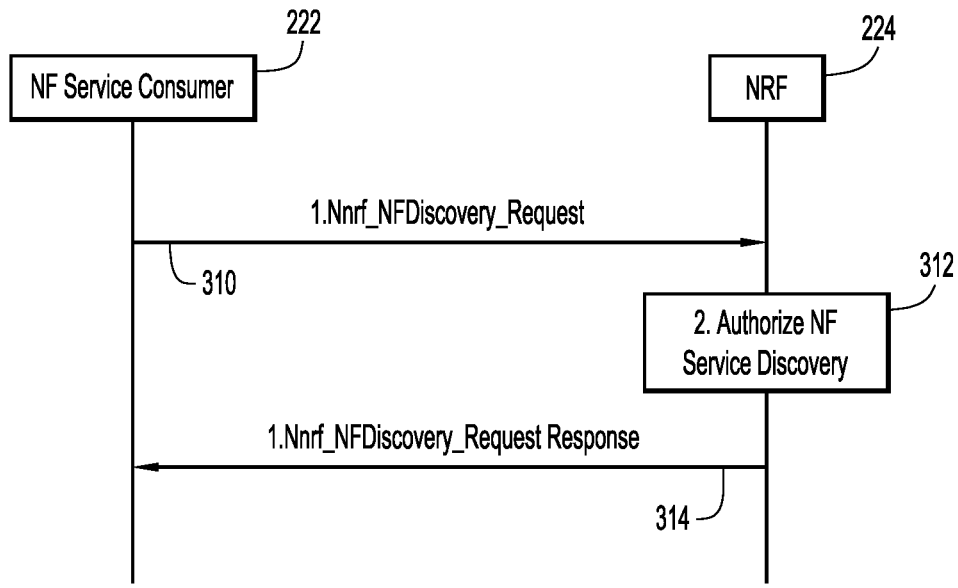
FIGS. 5 and 6 are diagrams illustrating the hPLMN discovery phase in more detail, according to an example embodiment.
Figure 6:
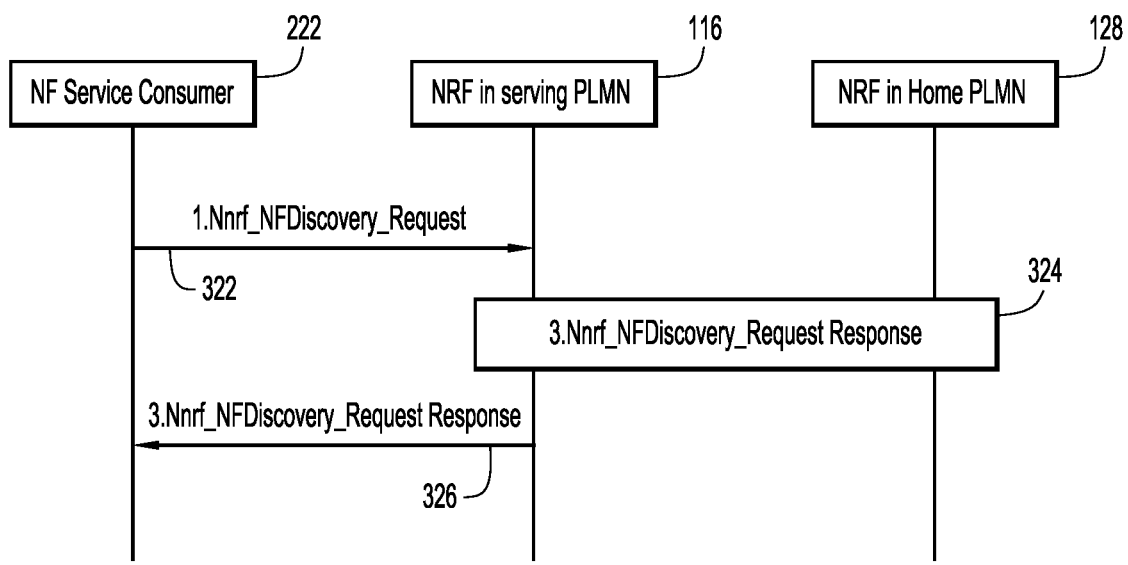
Figure 7:
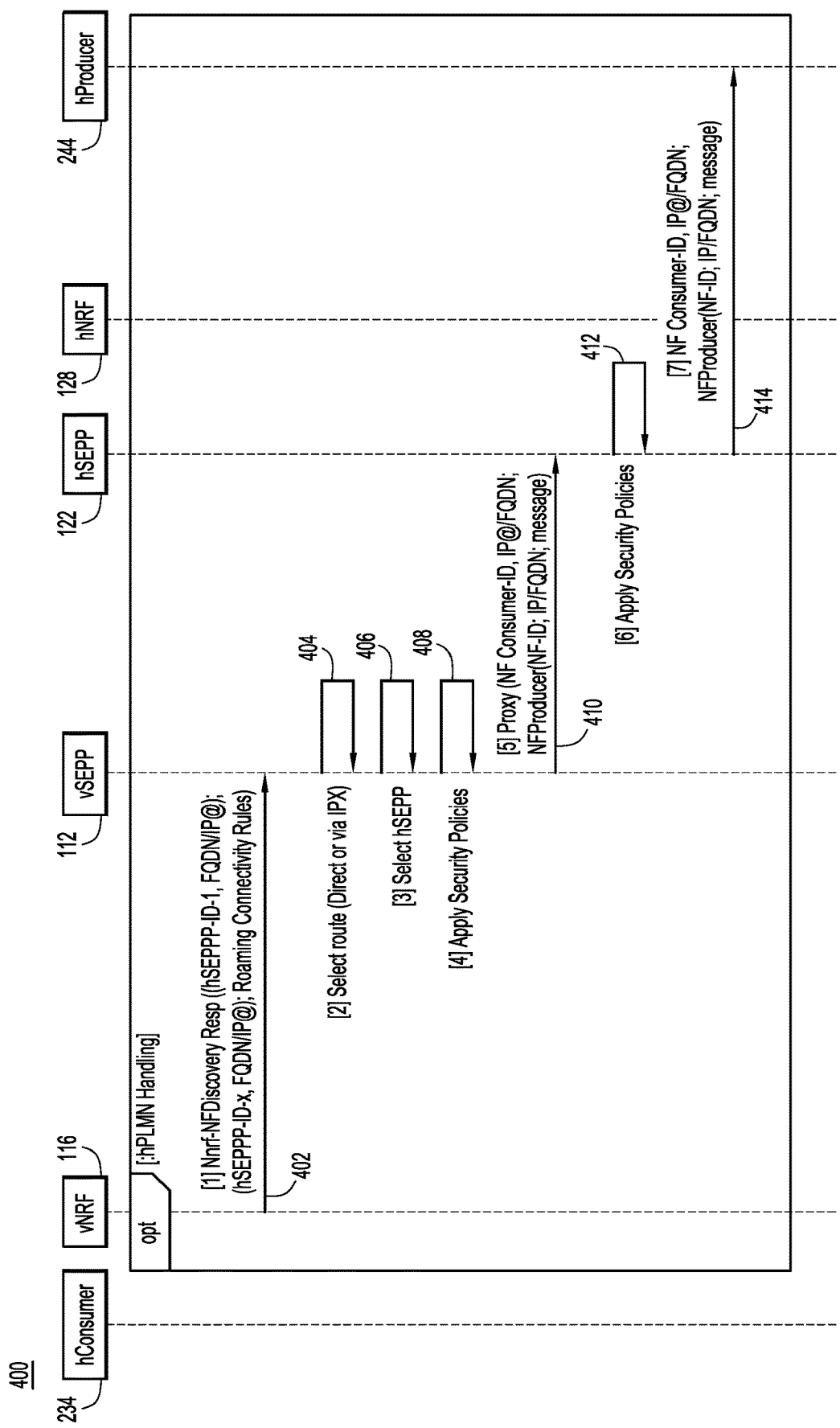
FIG. 7 is a sequence diagram depicting an hPLMN handling phase, according to an example embodiment.

Reference is now made to FIGS. 3A, 3B and 4-7. FIGS. 3A and 3B depict a sequence diagram/call flow for a NRF—SEPP registration phase and for an hPLMN discovery phase. FIG. 4 shows the NRF—consumer registration is detail. FIGS. 5 and 6 show the hPLMN discovery phase in more detail. FIG. 7 shows an hPLMN handling phase.

During the NRF-SEPP registration phase 200 shown in FIG. 3A, the vNRF 116 and the vSEPP 112 register with each other as shown at 210, and the hNRF 118 and hSEPP 122 register with each as shown at 215.

Turning briefly to FIG. 4, the NRF—service consumer registration call flow is shown at 220. This call flow follows the Nnrf_NF registration procedure of the 3GPP TS 23.502 specification. A network function (NF) service consumer (such as SEPP, AMF, SMF, etc.) shown generally at 222 registers with an NRF shown generally at 224 (either vNRF 116 or hNRF 128) using an Nnrf. The Nnrf identifies a Service-based Interface for the NRF.

The Network Function Services provided by Nnrf are:

Nnrf_NFManagement—Provides support for register, deregister and update service to NF, NF services. Provides consumers with notifications of newly registered NF along with its NF services.

Nnrf_NFDiscovery—Enables one NF service consumer to discover a set of NF instances with specific NF service or a target NF type. Also enables one NF service to discover a specific NF service.

Step 226 in the flow shown in FIG. 4 is triggered after the NF/SEPP is instantiated and activated by an orchestration system. At 226, the NF service consumer 222 sends a registration request (Nnrf_NFManagement_NFRegister request) to the NRF 225. At 228, the NRF 224 stores the NF profile for the request. At 229, the NRF 224 sends a response (Nnrf_NFManagement_NFRegister_response) back to the NF service consumer 222.

Referring back to FIG. 3A, the hPLMN discovery phase, shown at 230, is now described. The AMF 113 in the vPLMN needs to discover the UDM 124 in the hPLMN (shown in FIGS. 1A and 1B). Many of the steps of the hPLMN discovery phase 230 shown in FIGS. 3A and 3B are part of the 3GPP standards and follow the logic depicted in FIGS. 4-6, described below.

At 232, a consumer in the hPLMN (hConsumer) generically identified at reference numerally 234, sends a discovery request (Nnrf-NFDiscovery) to the vNRF 116. At 236, the vNRF 116 determines the hNRF for the hConsumer 234. Next, at 238, the vNRF 116 forwards the discovery request to the vSEPP 112. The vSEPP 112, at 240, forwards the discovery request to the hSEPP 122.

At 242, the hNRF 128 selects a producer NF, shown at 244. At 246, the hNRF 128 makes a selection on a per producer NF type in the hPLMN. This is a different hSEPP for AMF-UDM connectivity and for vPCF-hPCF connectivity. At 248, the hNRF 128 forwards a discovery response to the hSEPP 122. The discovery response includes identifier information, including Producer (NF-ID, FQDN/IP), where FQDN/IP refers to a full qualified domain name/IP address, hSEPP-ID-1 and hSEPP-ID-x. At 250, the hSEPP 122 forwards the discovery response to the vSEPP 112. Next, the vSEPP 112, at 252, forwards the discovery response to the vNRF 116.

At step 254, the vNRF 116 stores the hSEPP id allocated by the hNRF 128 (at operations 242 and 246) for the NF producer (e.g., UDM) shown at 244. At 256, the vNRF 116 sends the identifier information of the NF producer and of the vSEPP to the hConsumer 234.

Turning to FIG. 3B, at 258, the Consumer NF (hConsumer 234) requests the selection of a vSEPP. At 260, the vNRF selects the vSEPP. At 262, the vNRF 116 sends the identifier information of the selected vSEPP to the hConsumer 234. At 264, the hConsumer 234 sends to the vSEPP 112 a message forward request. At 266, the vSEPP 112 requests a roaming connectivity policy from the vNRF. At 268, the vNRF selects/determines roaming connectivity policy based on the request 266.

The flows of FIGS. 5 and 6 are largely based on the 3GPP TS 23.502 standard. FIG. 5 shows a call flow for NF/NF service discovery in the same PLMN, e.g., the visiting PLMN and FIG. 6 shows a call flow for NF/NF service discovery across PLMNs. In both FIGS. 5 and 6, the NRF selects a producer at the request of a consumer. In one example, the NF consumer is the AMF 113 and the NF producer is the UDM 124, shown in FIG. 1.

Referring to FIG. 5, the NF/NF service discovery call flow 300 between an NF service consumer 222 and a NRF 224, is now described. At 310, the NF service consumer 222 sends a discovery request (Nnrf_NFDiscovery_Request) to the NRF 224. At 312, the NRF 224 authorizes the Nnrf_NFDiscovery_Request. Based on the profile of the expected NF/NF service and the type of the NF service consumer, the NRF 224 determines whether the NF service consumer is allowed to discover the expected NF instance(s). If the expected NF instance(s) or NF service instance(s) are deployed in a certain network slice, the NRF authorizes 224 the discovery request according to the discovery configuration of the network slice, e.g. the expected NF instance(s) are only discoverable by the NF in the same network slice. If allowed, the NRF 224 determines the discovered NF instance(s) or NF service instance(s) and at 314 provides the information of a set of discovered NF instance(s) or NF service instance(s) to the NF service consumer 222 via a response message (Nnrf_NFDiscovery_Request Response).

The information includes: FQDN, IP address, or end point addresses (i.e. URLs) for the set of discovered NF instance(s) or NF service instance(s). In case the target NF is a User Data repository (UDR), if SUPI was used as optional input parameter in the request, the NRF 224 provides the UDR instance(s) that matches the optional input SUPI. Otherwise, if the SUPI is not provided in the request, the NRF 224 returns all applicable UDR instance(s) (e.g. based on the Data Set Id, NF type), and if applicable, the information of the range of SUPI(s) and/or Data Set Id each instance is supporting.

Reference is now made to FIG. 6. FIG. 6 shows a call flow 320 between an NF service consumer 222, and an NRF in the serving PLMN, i.e., the vNRF 116 and the NRF in the home PLMN, i.e., the hNRF 128. At 322, the NF service consumer 222 sends a discovery request to the NRF in the serving (visiting) PLMN, i.e., vNRF 116. At step 324, the NRF in the serving (visiting) PLMN identifies the NRF in home PLMN, i.e., hNRF 128, based on the home PLMN ID, and it requests "NF Discovery" service from NRF in home PLMN according the procedure shown in FIG. 5, to get the expected NF instance(s) or NF service instance(s) deployed in the home PLMN. As the NRF in the serving PLMN triggers the "NF Discovery" on behalf of the NF service consumer 222, the NRF in the serving PLMN does not replace the information of the service requester NF, i.e. NF consumer ID, in the Discovery Request message it sends to the hNRF 128. At 326, the NRF in the serving PLMN sends a discovery response to the NF service consumer. The discovery response includes identifiers of the expected NF instances or NF service instances in the home PLMN.

IPX Connectivity

A Roaming Connectivity (RC) Database (DB) at the NRF includes a per hPLMN-ID/Signaling partner connectivity, map and policies that determine direct connectivity or connectivity via the IPX, IPX selection/preference rules etc.

Accordingly, reference is now made to FIG. 7. FIG. 7 shows a sequence diagram of an hPLMN handling phase 400, during which roaming connectivity rules are obtained. Many of the steps shown in FIG. 7 are part of the 3GPP standards. In one example, the hConsumer 234 is the AMF 113 and the hProducer 244 is the UDM 124, shown in FIG. 1.

At 402, the vNRF 116 sends to the vSEPP 112 a discovery response that includes the roaming connectivity rules that were determined at operation 268 shown in FIG. 3B. At 404, the vSEPP 112 selects IPX or a direct route (as shown in FIG. 2) (to the hSEPP 122) based on the roaming connectivity policy rules it received from the vNRF at operation 402. The vSEPP 112 selects the IPX provider based on policy and status of the IPX network or direct route (no-IPX). At 406, the vSEPP 112 selects the hSEPP from the list of hSEPPs received from the vNRF 116. At 408, the vSEPP 112 applies security policies. Examples of security policies that the vSEPP 112 applies include messages allowed across the N32 interface per message code/type, list of JSON information elements allowed per message code/type, list of JSON information elements to be encrypted, integrity protection and encryption algorithms per roaming partner, etc.

At 410, the vSEPP 112 proxies communications to the selected hSEPP, i.e., hSEPP 122. At 412, the hSEPP applies security policies to the proxied communications. At 414, the hSEPP forwards the communications to the hProducer 244.

SEPP Registration with the NRF

The SEPP is added to the list of consumer NFs for the Nnrf_NFManagement-Register and Nnrf_NFDiscovery Request services. As shown in the Tables 1 and 2 below, there are new NRF services and the SEPP becomes a consumer of existing NRF services. SEPP is added to the list of consumer, and the new NRF service (Nnrf_RoamPolicy) is a new NRF service. NRF is the producer and SEPP is the consumer of the roaming policy service (Nnrf_RoamPolicy).

TABLE 1

New NRF Services and SEPP Becomes a Consumer of Existing NRF Services

| Service Name | Service Operations | Operation Semantics | Example Consumer(s) |
| --- | --- | --- | --- |
| Nnrf_NFManagement | NFRegister | Request/Response | AMF, SMF, UDM, AUSF, NEF, PCF, SMSF, NSSF, UPF, BSF, SEPP |
| Nnrf_NFDiscovery | Request | Request/Response | AMF, SMF, PCF, NEF, NSSF, SMSF, AUSF, SEPP* |
| Nnrf_RoamPolicy** | Request | Request/Response | SEPP |

*SEPP added to the list of consumers
**New NRF service; NRF is the producer and SEPP is the consumer of the Roaming Policy Service.

TABLE 2

SEPP Services

| Service Name | Service Operations | Operation Semantics | Example Consumer(s) |
| --- | --- | --- | --- |
| Nsepp-MessageForward | Request | Request/Response | AMF, SMF, UDM, AUSF, PCF, NSSF NRF, |

Figure 8:
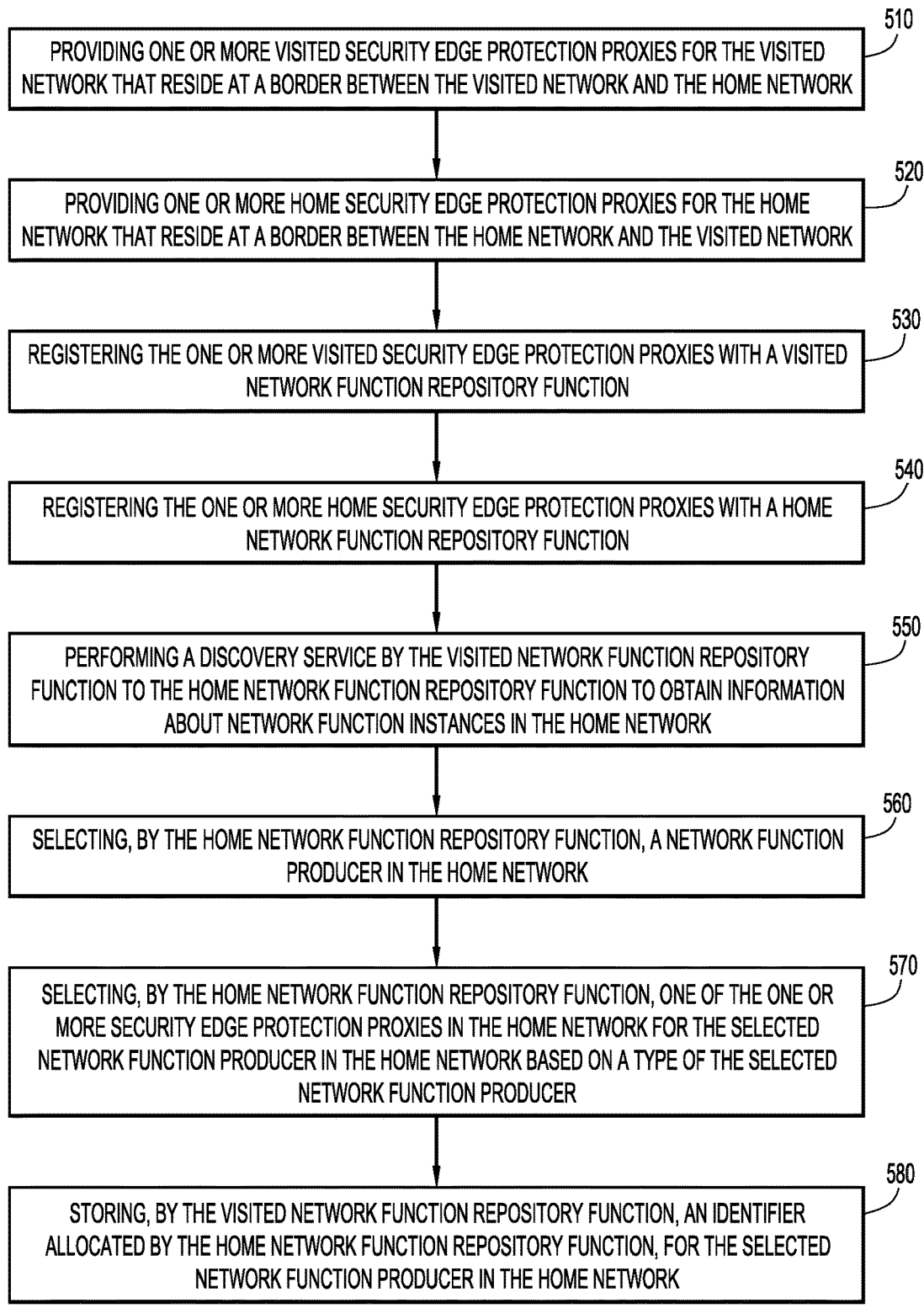
FIG. 8 is a flow chart depicting an overall operational flow of the SEPP registration and discovery mechanisms, according to an example embodiment.

Reference is now made to FIG. 8. FIG. 8 is a flow chart of a method 500 performed in a mobile core infrastructure network having a home network and a visited network to which a mobile subscriber device has roamed from the home network. At 510, the system provides/deploys one or more visited security edge protection proxies for the visited network that reside at a border between the visited network and the home network. At 520, the system provides/deploys one or more home security edge protection proxies for the home network that reside at a border between the home network and the visited network. At 530, the system registers the one or more visited security edge protection proxies with a visited network function repository function, and at 540, the system registers the one or more home security edge protection proxies with a home network function repository function.

A discovery service is performed, at 550, by the visited network function repository function to the home network function repository function to obtain information about network function instances in the home network. At 560, the home network function repository function selects a network function producer in the home network. At 570, the home network function repository function selects one of the one or more security edge protection proxies in the home network for the selected network function producer in the home network based on a type of the selected network function producer. At 580, the visited network function repository function selects an identifier allocated by the home network function repository function, for the selected network function producer in the home network.

In one form, the method 500 further includes, the visited network function repository function receiving from a network function consumer in the visited network a request for selection of one of the one or more visited security edge protection proxies; and selecting one of the one or more visited security edge protection proxies.

The visited network function repository function may further perform operations of: receiving from the selected visited security edge protection proxy a request for a roaming policy; and determining a roaming connectivity policy based on the request. In so doing, the visited network function repository function may send, to the selected visited security edge protection proxy, roaming connectivity policy rules based on the roaming connectivity policy.

Further, the method 500 may include: the one or more home security edge protection proxies in the home network, based on the roaming connectivity policy rules; selecting, by the selected visited security edge protection proxy, one of the one or more home security edge protection proxies in the home network; and proxying, by the selected visited security edge protection proxy, messages to the selected home security edge protection proxy according to the selected connectivity route. The selected connectivity route may be either a direct route via Transport Layer Security (TLS) protocol or a route via an Internetwork Packet Exchange (IPX) network based on policy and status of the IPX network.

The method 500 may further include applying, by the selected visited security edge protection proxy, one or more security policies to the messages.

As described above, the one or more visited security edge protection proxies may perform a non-transparent proxy operation on messages from a network function consumer in the visited network to a network function producer in the home network, and the one or more visited security edge protection proxies may perform a non-transparent proxy operation on messages from a network function producer in the home network to a network function consumer in the visited network.

In summary, as presented herein, the SEPP is fully defined as a 5G NF that registers with the NRF and as such is discoverable by consumer NFs. The SEPP exposes its own services in line with the SBA architecture.

Inter-PLMN roaming connectivity polices enable the vSEPP to:

Select the hSEPP per producer NF-Type in the hPLMN; and

Select direct route between PLMNs or indirect via one or more IPX providers.

Figure 9:
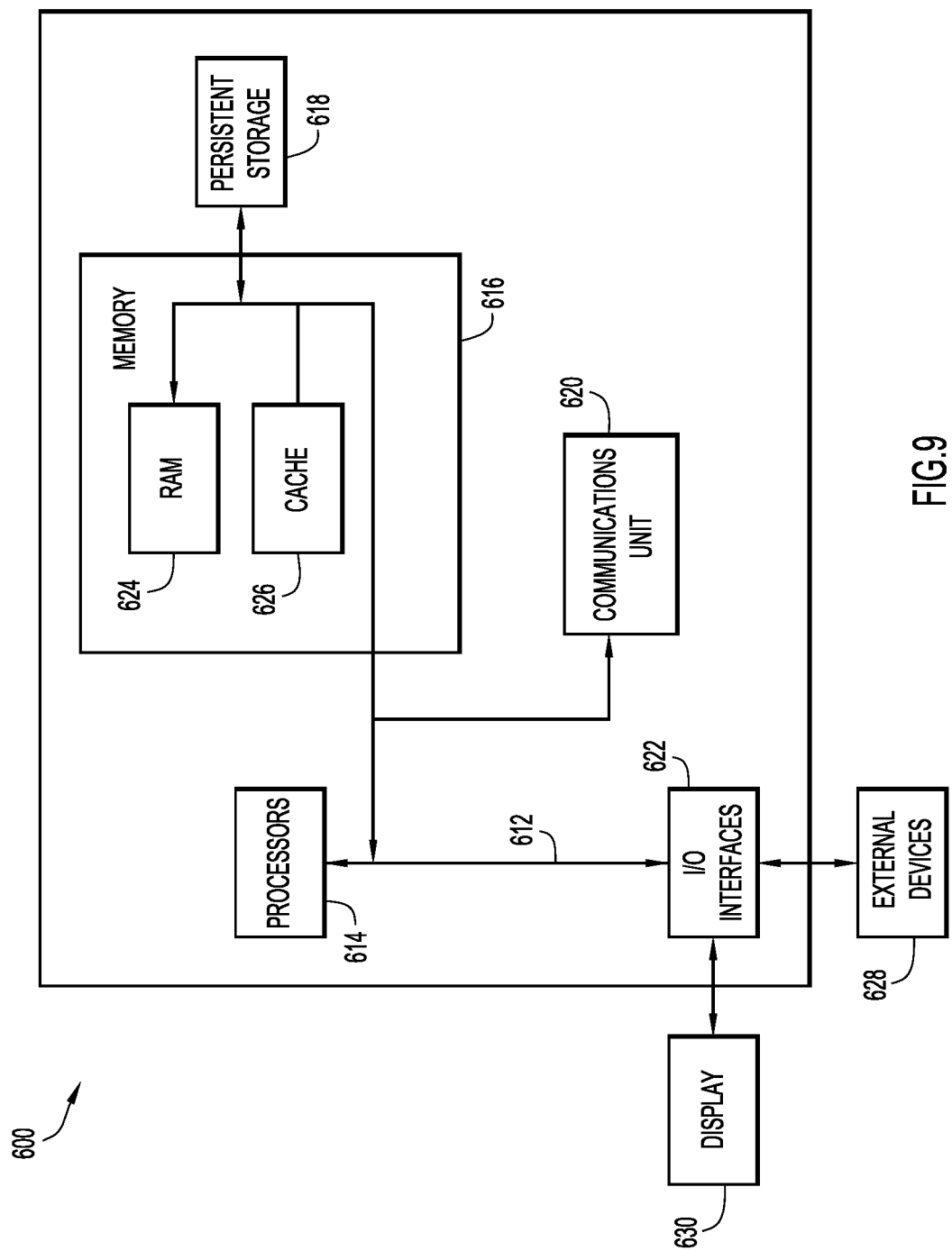
FIG. 9 is a block diagram of the SEPP and other entities configured to participate in the operations depicted herein, according to an example embodiment.

FIG. 9 is a block diagram of an SEPP and other entities configured to participate in the operations presented herein. Generally, the SEPP includes a communications interface to enable network communications, one or more processors and a memory that stores software instructions for control logic. The memory may be read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the processor(s)) it is operable to perform the operations described herein.

More specifically, FIG. 9 shows a hardware block diagram of a computing or networking entity/device/apparatus 600 that may be configured to perform the operations of a SEPP and other entities that are involved in the mechanisms presented herein. It should be appreciated that FIG. 9 provides only an illustration of one embodiment and does not imply any limitations with regard to the environments in which different embodiments may be implemented. Many modifications to the depicted environment may be made.

As depicted, the apparatus 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to apparatus 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein may be identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, read only memory (ROM), floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided that is performed in a mobile core infrastructure network having a home network and a visited network to which a mobile subscriber device has roamed from the home network, the method comprising: providing one or more visited security edge protection proxies for the visited network that reside at a border between the visited network and the home network; providing one or more home security edge protection proxies for the home network that reside at a border between the home network and the visited network; registering the one or more visited security edge protection proxies with a visited network function repository function; registering the one or more home security edge protection proxies with a home network function repository function; performing a discovery service by the visited network function repository function to the home network function repository function to obtain information about network function instances in the home network; selecting, by the home network function repository function, a network function producer in the home network; selecting, by the home network function repository function, one of the one or more security edge protection proxies in the home network for the selected network function producer in the home network based on a type of the selected network function producer; and storing, by the visited network function repository function, an identifier allocated by the home network function repository function, for the selected network function producer in the home network.

In another form, an apparatus is provided comprising: a communication interface configured to enable communications among entities in a mobile core infrastructure network having a home network and a visited network to which a mobile subscriber device has roamed from the home network; a memory; and a processor coupled to the communication interface and to the memory, wherein the processor is configured to: send via the communication interface to a home network function repository function in the home network, a discovery request to obtain information about network function instances in the home network; and receive via the communication interface from the home network function repository function in the home network, an identifier allocated by the home network function repository function for a selected network function producer in the home network.

In another form, one or more non-transitory computer readable storage media are provided that are encoded with instructions that, when executed by a processor, cause the processor to perform operations on behalf of a visited network function repository function in a visiting network of a mobile core infrastructure network that includes a home network and the visited network to which a mobile subscriber device has roamed from the home network, the operations including: sending to a home network function repository function in the home network, a discovery request to obtain information about network function instances in the home network; and receiving from the home network function repository function in the home network, an identifier allocated by the home network function repository function for a selected network function producer in the home network.

In still another form, an apparatus is provided comprising: a communication interface configured to enable communications among entities in a mobile core infrastructure network having a home network and a visited network to which a mobile subscriber device has roamed from the home network; a memory; and a processor coupled to the communication interface and to the memory, wherein the processor is configured to: receive via the communication interface from a visited network function repository function, a discovery request for information about network function instances in the home network; select a network function producer in the home network; select one of one or more security edge protection proxies in the home network for the selected network function producer in the home network based on a type of the selected network function producer; and send via the communication interface to a visited network function repository function, an identifier allocated for the selected network function producer.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed in a mobile core infrastructure network having a home network and a visited network to which a mobile subscriber device has roamed from the home network, the method comprising:
   providing one or more visited security edge protection proxies for the visited network that reside at a border between the visited network and the home network;
   providing one or more home security edge protection proxies for the home network that reside at a border between the home network and the visited network;
   registering the one or more visited security edge protection proxies with a visited network function repository function;
   registering the one or more home security edge protection proxies with a home network function repository function;
   performing a discovery service by the visited network function repository function to the home network function repository function to obtain information about network function instances in the home network;
   selecting, by the home network function repository function, a network function producer in the home network;
   selecting, by the home network function repository function, one of the one or more home security edge protection proxies in the home network for the network function producer in the home network based on a type of the network function producer; and
   storing, by the visited network function repository function, an identifier allocated by the home network function repository function, for the network function producer in the home network.

2. The method of claim 1, further comprising, at the visited network function repository function:
   receiving from a network function consumer in the visited network a request for selection of one of the one or more visited security edge protection proxies; and
   selecting a first visited security edge protection proxy of the one or more visited security edge protection proxies.

3. The method of claim 2, further comprising the visited network function repository function:
   receiving from the first visited security edge protection proxy, a request for a roaming policy; and
   determining a roaming connectivity policy based on the request.

4. The method of claim 3, further comprising:
   sending, by the visited network function repository function, to the first visited security edge protection proxy, roaming connectivity policy rules based on the roaming connectivity policy.

5. The method of claim 4, further comprising:
   selecting, by the first visited security edge protection proxy, a connectivity route to the one or more home security edge protection proxies in the home network, based on the roaming connectivity policy rules;
   selecting, by the first visited security edge protection proxy, a first home security edge protection proxy of the one or more home security edge protection proxies in the home network; and
   proxying, by the first visited security edge protection proxy, messages to the first home security edge protection proxy according to the connectivity route.

6. The method of claim 5, wherein the connectivity route is either a direct route via Transport Layer Security (TLS) protocol or a route via an Internetwork Packet Exchange (IPX) network based on policy and status of the IPX network.

7. The method of claim 5, further comprising:
   applying, by the first visited security edge protection proxy, one or more security policies to the messages.

8. The method of claim 1, wherein the one or more visited security edge protection proxies perform a non-transparent proxy operation on messages from a network function consumer in the visited network to the network function producer in the home network, and the one or more visited security edge protection proxies perform a non-transparent proxy operation on messages from the network function producer in the home network to the network function consumer in the visited network.

9. An apparatus comprising:
a communication interface configured to enable communications among entities in a mobile core infrastructure network having a home network and a visited network to which a mobile subscriber device has roamed from the home network;
a memory; and
a processor coupled to the communication interface and to the memory, wherein the processor is configured to:
send, via the communication interface to a home network function repository function in the home network, a discovery request to obtain information about network function instances in the home network;
receive via the communication interface from the home network function repository function in the home network, an identifier allocated by the home network function repository function for a network function producer in the home network;
receive, from a network function consumer in the visited network, a request for a selection of a first visited security edge protection proxy of one or more visited security edge protection proxies in the visited network; and
select the first visited security edge protection proxy of the one or more visited security edge protection proxies.

10. The apparatus of claim 9, wherein the processor is configured to:
receive, from the first visited security edge protection proxy, a request for a roaming policy; and
determine a roaming connectivity policy based on the request.

11. The apparatus of claim 10, wherein the processor is configured to:
send, to the first visited security edge protection proxy, roaming connectivity policy rules based on the roaming connectivity policy such that the first visited security edge protection proxy selects a connectivity route based on the roaming connectivity policy rules.

12. The apparatus of claim 11, wherein the selected connectivity route is either a direct route via Transport Layer Security (TLS) protocol or a route via an Internetwork Packet Exchange (IPX) network based on policy and status of the IPX network.

13. The apparatus of claim 9, wherein the processor is further configured to:
store, in the memory, the identifier for the network function producer.

14. The apparatus of claim 11, wherein the first visited security edge protection proxy is configured to proxy messages to the home network according to the connectivity route.

15. One or more non-transitory computer readable storage media encoded with instructions that, when executed by a processor, cause the processor to perform operations on behalf of a visited network function repository function in a visited network of a mobile core infrastructure network that includes a home network and the visited network to which a mobile subscriber device has roamed from the home network, the operations including:

sending, to a home network function repository function in the home network, a discovery request to obtain information about network function instances in the home network;
receiving, from the home network function repository function in the home network, an identifier allocated by the home network function repository function for a network function producer in the home network;
receiving, from a network function consumer in the visited network, a request for a selection of a first visited security edge protection proxy of one or more visited security edge protection proxies in the visited network; and
selecting the first visited security edge protection proxy of the one or more visited security edge protection proxies.

16. The non-transitory computer readable storage media of claim 15, further comprising instructions operable for:
receiving, from the first visited security edge protection proxy, a request for a roaming policy; and
determining a roaming connectivity policy based on the request.

17. The non-transitory computer readable storage media of claim 16, further comprising instructions operable for:
sending, to the first visited security edge protection proxy, roaming connectivity policy rules based on the roaming connectivity policy such that the first visited security edge protection proxy selects a connectivity route based on the roaming connectivity policy rules.

18. The non-transitory computer readable storage media of claim 17, wherein the connectivity route is either a direct route via Transport Layer Security (TLS) protocol or a route via an Internetwork Packet Exchange (IPX) network based on policy and status of the IPX network.

19. An apparatus comprising:
a communication interface configured to enable communications among entities in a mobile core infrastructure network having a home network and a visited network to which a mobile subscriber device has roamed from the home network;
a memory; and
a processor coupled to the communication interface and to the memory, wherein the processor is configured to:
receive via the communication interface from a visited network function repository function, a discovery request for information about network function instances in the home network;
select a network function producer in the home network;
select one of one or more security edge protection proxies in the home network for the network function producer in the home network based on a type of the network function producer; and
send via the communication interface to the visited network function repository function, an identifier allocated for the network function producer.

20. The apparatus of claim 19, wherein the processor is configured to send the identifier for the network function producer in a discovery response that is responsive to the discovery request.

* * * * *

UNITED STATES PATENT AND TRADEMARK OFFICE
CERTIFICATE OF CORRECTION

| | | |
|---|---|---|
| PATENT NO. | : 11,050,788 B2 | Page 1 of 1 |
| APPLICATION NO. | : 16/208011 | |
| DATED | : June 29, 2021 | |
| INVENTOR(S) | : Konstantin Livanos | |

It is certified that error appears in the above-identified patent and that said Letters Patent is hereby corrected as shown below:

In the Claims

Claim 3, Column 14, Line 32, please replace "receiving from the" with --receiving, from the--

Claim 12, Column 15, Lines 43-44, please replace "the selected connectivity" with --the connectivity--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*